United States Patent
Huang et al.

(10) Patent No.: US 9,653,028 B2
(45) Date of Patent: May 16, 2017

(54) PIXEL STRUCTURE

(71) Applicant: Au Optronics Corporation, Hsinchu (TW)

(72) Inventors: Yu-Sheng Huang, Kaohsiung (TW); Ya-Ling Hsu, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 81 days.

(21) Appl. No.: 14/552,487

(22) Filed: Nov. 25, 2014

(65) Prior Publication Data
US 2015/0077445 A1    Mar. 19, 2015

Related U.S. Application Data

(62) Division of application No. 13/350,799, filed on Jan. 15, 2012, now Pat. No. 8,928,703.

(30) Foreign Application Priority Data

Sep. 15, 2011 (TW) .............................. 100133232 A (51) Int. Cl.
| | |
|---|---|
| *G09G 5/10* | (2006.01) |
| *G09G 3/36* | (2006.01) |
| *G02F 1/1362* | (2006.01) |
| *G02F 1/1335* | (2006.01) |
| *G02F 1/1343* | (2006.01) |

(52) U.S. Cl.
CPC ......... *G09G 3/3607* (2013.01); *G02F 1/1335* (2013.01); *G02F 1/13624* (2013.01); *G02F 1/136286* (2013.01); *G09G 3/3696* (2013.01); *G02F 2001/134345* (2013.01); *G09G 2310/0251* (2013.01)

(58) Field of Classification Search
CPC ............... G09G 3/3607; G09G 3/3696; G09G 2310/0251; G02F 1/1335; G02F 1/136286; G02F 1/13624; G02F 2001/134345
See application file for complete search history.

(56) References Cited

U.S. PATENT DOCUMENTS

| | | | |
|---|---|---|---|
| 2001/0019382 A1* | 9/2001 | Song | G09G 3/3607 349/106 |
| 2008/0246038 A1* | 10/2008 | Um | G02F 1/13624 257/72 |
| 2009/0006661 A1* | 1/2009 | Nagata | G06F 3/038 710/18 |

* cited by examiner

*Primary Examiner* — Andrew Sasinowski
*Assistant Examiner* — Brent D Castiaux
(74) *Attorney, Agent, or Firm* — Jianq Chyun IP Office (57) ABSTRACT

A pixel structure is provided. The pixel structure includes a first pixel unit, a second pixel unit and a discharge unit. The first pixel unit includes a first active device and a first pixel electrode. The second pixel unit includes a second active device and a second pixel electrode. Gates of the first active device and the second active device are electrically connected to a scan line. Drains of the first active device and the second active device are electrically connected to a data line. The first pixel electrode is electrically connected to a source of the first active device. The second pixel electrode is electrically connected to a source of the second active device. The discharge unit is configured to set that a voltage of the second pixel electrode is smaller than a threshold voltage according to a driving signal received by a driving line.

10 Claims, 8 Drawing Sheets

PIXEL STRUCTURE

CROSS-REFERENCE TO RELATED APPLICATION

This is a divisional application of and claims the priority benefit of patent application Ser. No. 13/350,799, filed on Jan. 15, 2012, which claims the priority benefit of Taiwan application serial no. 100133232, filed on Sep. 15, 2011. The entirety of each of the above-mentioned patent applications is hereby incorporated by reference herein and made a part of this specification.

BACKGROUND OF THE INVENTION

1. Field of the Invention

The present invention relates to a pixel structure, and more particularly to a pixel structure of a liquid crystal display (LCD) panel.

2. Description of Related Art

The LCD has been widely applied nowadays to replace the cathode ray tube display. Along with the improvement of the semiconductor technology, the LCD has advantages such as low power consumption, light weight, high resolution, high saturation and long lifespan and has been widely applied in all sorts of electronic products having a display function. In daily life, the LCD may be applied in electronic devices such as the LCD screen of a notebook computer, a laptop computer and an LCD TV. In teaching, the LCD may be applied in an electronic whiteboard.

Generally speaking, the notebook computer, the LCD screen or the LCD TV is configured to display image and has high requirements for color exhibition, so the design is made mainly in consideration of the image contrast, resolution and the liquid crystal response speed. The electronic whiteboard is generally configured for teaching, so the design is focused on the display brightness. According to the above description, in the situations (for example, classroom or conference room) where the display image and the teaching are both required, the LCD TV and the electronic whiteboard need to be configured accordingly. Due to the different design requirements, the LCD TV and the electronic whiteboard cannot replace each other, so the cost and room must be spent for purchasing and accommodating the display devices which are similar but different.

SUMMARY

The present invention is directed to a pixel structure. A discharge unit determines to set that a second pixel electrode is smaller than a threshold voltage according to a driving signal so as to stay in a color display mode or a whiteboard mode corresponding to a display panel. Whereby, one display panel can meet the display requirements of both the color image display and the electronic whiteboard.

The present invention provides a pixel structure, which is electrically connected to a scan line, a driving line and a data line. The pixel structure includes a first pixel unit, a second pixel unit and a discharge unit. The first pixel unit includes a first active device and a first pixel electrode. The first active device has a first gate, a first source and a first drain, in which the first gate is electrically connected to a scan line and the first drain is electrically connected to a data line. The first pixel electrode is electrically connected to the first source. The second pixel unit includes a second active device and a second pixel electrode. The second active device has a second gate, a second source and a second drain, in which the second gate is electrically connected to the scan line and the second drain is electrically connected to the data line. The second pixel electrode is electrically connected to the second source. The discharge unit is electrically connected to the second pixel electrode and the scan line to set that a voltage of the second pixel electrode is smaller than a threshold voltage according to a driving signal received by the driving line and a scan signal received from the scan line.

In an embodiment of the present invention, the discharge unit includes a first switch and a second switch. The first switch has a first end, a second end and a first control end, in which the first end is electrically connected to a common voltage and the first control end is electrically connected to the scan line. The second switch has a third end, a fourth end and a second control end, in which the third end is electrically connected to the second end, the fourth end is electrically connected to the second pixel electrode and the second control end is electrically connected to the driving line.

In an embodiment of the present invention, when the scan line and the driving line fully receive the scan signal and the driving signal at the same time, the pixel structure is in a color display mode. When the time the scan line fully receives the scan signal is earlier than or later than that the driving line fully receives the driving signal, the pixel structure is in a whiteboard mode.

In an embodiment of the present invention, the pixel structure further includes a color resistant region and a non-color resistant region. The color resistant region is configured corresponding to the first pixel unit. The non-color resistant region is configured corresponding to the second pixel unit. A sum of an area of the color resistant region and an area of the non-color resistant region is equal to an area of the pixel transparent region.

In an embodiment of the present invention, the area of the non-color resistant region accounts for 10%~30% of the area of the pixel transparent region.

In an embodiment of the present invention, the color resistant region is one of a red color resistant region, a green color resistant region and a blue color resistant region.

In an embodiment of the present invention, the driving line is a first scan line.

In an embodiment of the present invention, the first active device and the second active device are a thin film transistor (TFT) respectively.

Based on the above description, in the pixel structure according to the embodiments of the present invention, the discharge unit sets that the voltage of the second pixel electrode is smaller than the threshold voltage according to the driving signal of the driving line, so that the pixel structure is in the color display mode or otherwise, the pixel structure is in the whiteboard mode. Whereby, one display panel can meet the display requirements of both the LCD TV and the electronic whiteboard.

In order to make the features and advantages of the present invention clearer and more comprehensible, the present invention is described in detail below with reference to embodiments and the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
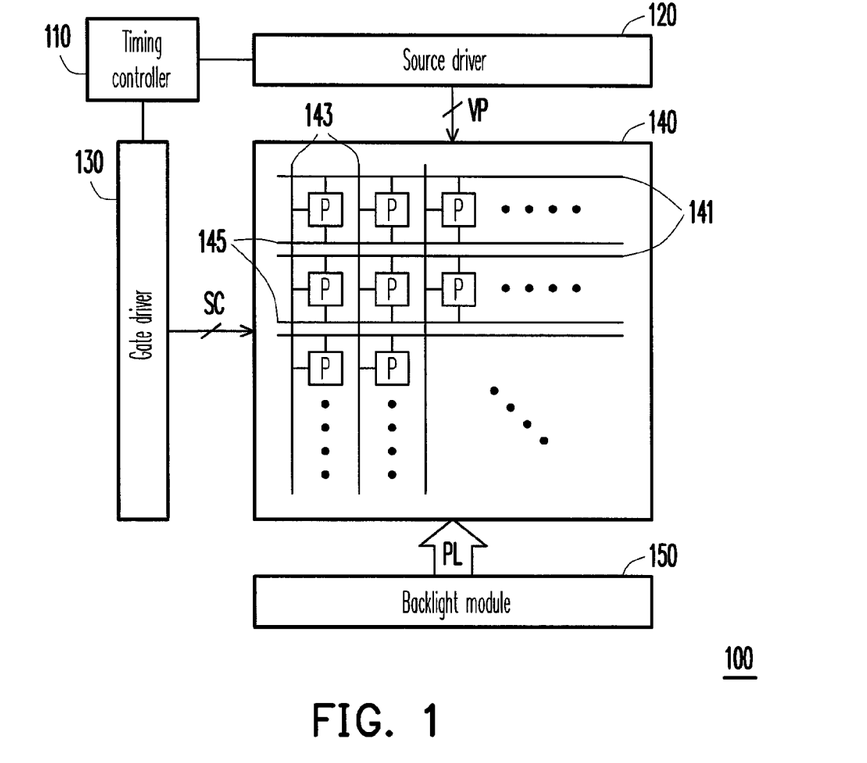
FIG. 1 is a schematic systematic view of a display according to an embodiment of the present invention.

FIG. 1 is a schematic systematic view of a display according to an embodiment of the present invention. Referring to FIG. 1, in this embodiment, the display 100 includes a timing controller 110, a source driver 120, a gate driver 130, a display panel 140 and a backlight module 150. The display panel 140 is for example an LCD panel and at least includes a plurality of scan lines 141, a plurality of data lines 143, a plurality of driving lines 145 and a plurality of pixels P arranged in arrays. Each pixel P is electrically connected to a corresponding scan line 141, a corresponding data line 143 and a corresponding driving line 145.

The gate driver 130 is electrically connected to the timing controller 110 and the display panel 140, and is controlled by the timing controller 110 to sequentially provide a plurality of scan signals SC to the scan lines 141 of the display panel 140 to sequentially actuate each row of pixels P. The source driver 120 is electrically connected to the timing controller 110 and the display panel 140, and is controlled by the timing controller 110 to provide a plurality of pixel voltages VP to the data lines 143 of the display panel 140 so as to transmit the pixel voltages VP to the actuated pixels P. The backlight module 150 provides a plane light source PL required by the display panel 140 so that the display panel 140 may display image.

In this embodiment, each pixel P may be controlled by the corresponding scan signal SC and the signal of the corresponding driving line 145 to adjust an optical effect (for example, a magnitude of the color gamut or the light transmittance), and the control method will be explained later. In other words, when the display 100 is operated in the color display mode, the color gamut of each pixel P is controlled to be the maximum for facilitating the image display, and the light transmittance is reduced accordingly. When the display 100 is operated in the whiteboard mode, the light transmittance of each pixel P is controlled to be increased for facilitating the display of lines or letters, and the color gamut is reduced accordingly. In other embodiments, the display panel 140 is not configured with the driving lines 145 and each pixel P is electrically connected to two neighbour scan lines 141, so the pixel P is controlled by the two neighbour scan signals SC to adjust the optical effect. The above description may be modified by persons of ordinary skilled in the art, and is not limited to the embodiments of the present invention.

Figure 2:
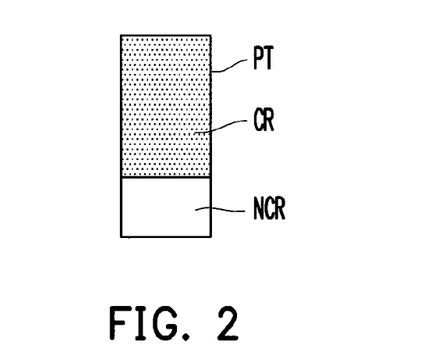
FIG. 2 is a schematic diagram of the distribution of a pixel transparent region of a pixel P in FIG. 1 according to an embodiment of the present invention.

FIG. 2 is a schematic diagram of the distribution of a pixel transparent region of a pixel P in FIG. 1 according to an embodiment of the present invention. Referring to FIG. 1 and FIG. 2, in this embodiment, the pixel transparent region PT of the pixel P includes a color resistant region CR and a non-color resistant region NCR, that is, a sum of the area of the color resistant region CR and the area of the non-color resistant region NCR is substantially equal to the area of the pixel transparent region PT.

According to the design of the pixel P, the color resistant region CR may be a red color resistant region, a green color resistant region or a blue color resistant region. If the color resistant region CR is the red color resistant region, a red filter may be configured correspondingly on the color resistant region CR. If the color resistant region CR is the green color resistant region, a green filter may be configured correspondingly on the color resistant region. If the color resistant region CR is a blue color resistant region, a blue filter may be configured correspondingly on the color resistant region CR. In addition, a white/transparent filter may be configured correspondingly in the non-color resistant region NCR or no filter is configured in the non-color resistant NCR region.

Figure 3A:
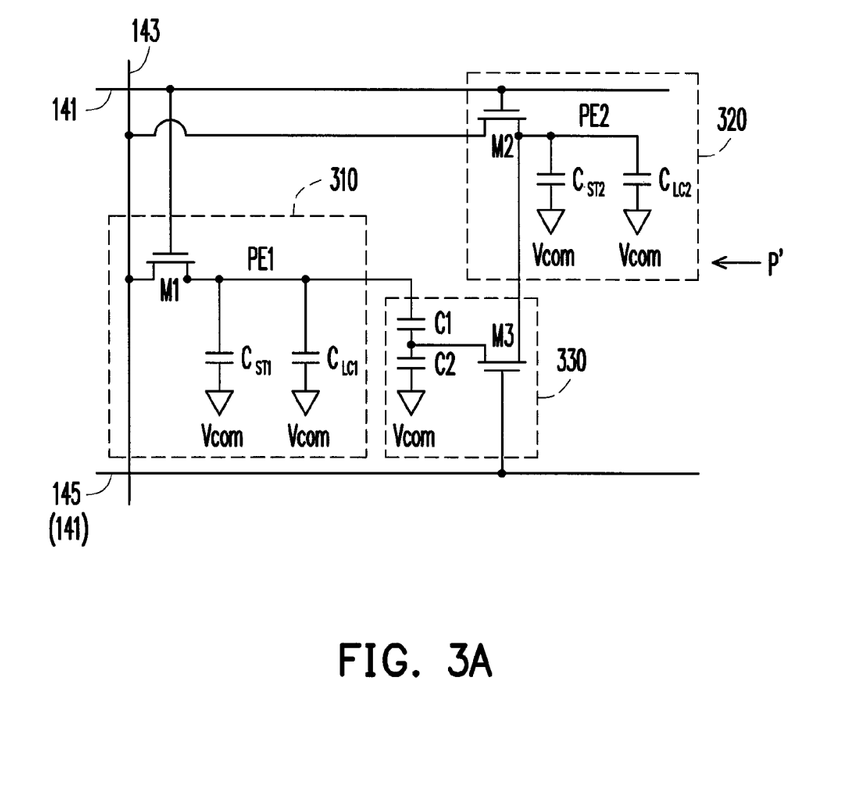
FIG. 3A is a schematic diagram of a circuit structure of the pixel P in FIG. 1 according to a first embodiment of the present invention.

FIG. 3A is a schematic diagram of a circuit structure of the pixel P in FIG. 1 according to a first embodiment of the present invention. Referring to FIG. 3A, in this embodiment, the pixel structure P' includes a first pixel unit 310, a second pixel unit 320 and a discharge unit 330. The color resistant region CR in FIG. 2 is configured corresponding to the first pixel unit 310 and the non-color resistant region NCR in FIG. 2 is configured corresponding to the second pixel unit 320. The pixel structure P' of this embodiment is adapted for a normal black display panel.

The first pixel unit 310 includes a first active device (here, for example TFT M1), a first pixel electrode PE1, a first storage capacitor $C_{ST1}$ and a first liquid crystal capacitor $C_{LC1}$. A gate of the TFT M1 is electrically connected to the scan line 141, a drain of the TFT M1 is electrically connected to the data line 143 and a source of the TFT M1 is electrically connected to the first pixel electrode PE1. The first storage capacitor $C_{ST1}$ and the first liquid crystal capacitor $C_{LC1}$ respectively are electrically connected between the first pixel electrode PE1 and a common voltage Vcom.

The second pixel unit 320 includes a second active device (here, for example TFT M2), a second pixel electrode PE2, a second storage capacitor $C_{ST2}$ and a second liquid crystal capacitor $C_{LC1}$. A gate of the TFT M2 is electrically connected to the scan line 141, a drain of the TFT M2 is electrically connected to the data line 143 and a source of the TFT M2 is electrically connected to the second pixel electrode PE2. The second storage capacitor $C_{ST2}$ and the second liquid crystal capacitor $C_{LC2}$ are respectively electrically connected between the second pixel electrode PE2 and the common voltage Vcom.

The discharge unit 330 includes a first capacitor C1, a second capacitor C2 and a first switch (here, for example, the TFT M3). The first capacitor C1 is electrically connected to the source of the TFT M1. The second capacitor C2 is serially connected to the first capacitor C1 and is electrically connected between the first capacitor C1 and the common voltage Vcom. A source (corresponding to the first end) of the TFT M3 is electrically connected to an electrical connection point of the first capacitor C1 and the second capacitor C2, a drain (corresponding to the second end) of the TFT M3 is electrically connected to the second pixel electrode PE2 and a gate (corresponding to first control end) of the TFT M3 is electrically connected to the driving line 145.

Referring to FIG. 1, FIG. 2 and FIG. 3A, when the TFT M3 is controlled by a signal (corresponding to the driving signal) transferred by the driving line 145, the second capacitor C2 absorbs charge stored in the second storage capacitor $C_{ST2}$ and the second liquid crystal capacitor $C_{LC2}$, so the voltage of the second pixel electrode PE2 may be lowered. When the TFT M2 is not conducted and the capacitance of the second capacitor C2 is greater than or equal to 6 times the capacitance of the second liquid crystal capacitor $C_{LC2}$, the second capacitor C2 makes the voltage of the second pixel electrode PE2 smaller than a threshold voltage, which results in stopping rotation or rotating insufficiently of the liquid crystal (not shown) corresponding to the second pixel unit 320 (that is, corresponding to the second pixel electrode PE2) and thus the light of the backlight module 150 cannot penetrate. Therefore the display is in a black state. The threshold voltage means a threshold value of the applied voltage for controlling the liquid crystal molecules to be at an on-state or off-state. If the applied voltage is smaller than the threshold value, the liquid crystal will be in an off-state and there is no light passing through the liquid crystal. If the applied voltage is greater than or equal to the threshold value, the liquid crystal will be in an on-state and light can pass through the liquid crystal.

Now, the non-color resistant region NCR of each pixel P of the display panel 140 does not function equivalently, so the color gamut of the display panel 140 achieves the maximal value. In this way, it facilitates the display with high color saturation images. The display panel 140 may be regarded as in the color display mode, that is, each pixel P may be regarded as in the color display mode.

On the other hand, when the TFT M2 and the TFT M3 are conducted at the same time, the pixel voltage VP is transmitted to the pixel electrode PE2 (that is, transmitted to the second storage capacitor $C_{ST2}$ and the second liquid crystal capacitor $C_{LC2}$) via the conducted transistor M2. Although being influenced by the second capacitor C2, the voltage of the pixel electrode PE2 still remains greater than or equal to the threshold voltage, or even equal to the pixel voltage VP depending on the output ability of the source driver 120, which is not limited in the embodiments of the present invention. Alternatively, when the TFT M2 is conducted and the TFT M3 is not conducted, the pixel voltage VP is transmitted to the pixel electrode PE2 via the conducted transistor M2, the pixel electrode PE2 will not be electrically connected to the second capacitor C2, and the voltage of the pixel electrode PE2 remains the pixel voltage VP without being influenced by the second capacitor C2.

Now, the non-color resistant region NCR of each pixel P in the display panel 140 may improve the display brightness of each pixel P, so the brightness of the display panel 140 is increased. As a result, it facilitates the performance of displaying lines or letters. The display panel 140 may be regarded as in the whiteboard mode, that is, each pixel P may be regarded as in the whiteboard mode.

Based on the above description, the discharge unit 330 is electrically connected to the second pixel electrode PE2. The discharge unit 330 controls the voltage of the second pixel electrode PE2 to be smaller than a threshold voltage according to a signal (corresponding to the driving signal) received by the driving line 145. Based on the common voltage Vcom, here, the threshold voltage is the voltage of driving the liquid crystal (not shown) to rotate sufficiently to let the light to penetrate, that is the voltage of driving the liquid crystal to let the light of the backlight module 150 to penetrate and display the minimal greyscale value.

Figure 3B:
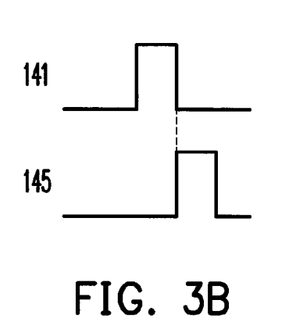
FIG. 3B to FIG. 3F are schematic diagram of signals of a scan line 141 and a driving line 145 in FIG. 3A according to an embodiment of the present invention.

FIG. 3B to FIG. 3F are schematic diagram of signals of a scan line 141 and a driving line 145 in FIG. 3A according to an embodiment of the present invention. Referring to FIG. 3A and FIG. 3B, in this embodiment, after a pulse (corresponding to the scan signal SC) of the scan line 141 is formed, a pulse (corresponding to the driving signal) of the driving line 145 is formed. That is, after the scan line 141 fully receiving the scan signal SC, the driving line 145 fully receives the driving signal. Now, the TFT M3 and the TFT M2 are sequentially conducted and the conducted period of the TFT M3 and the TFT M2 are not overlapped with each other, the voltage of the second pixel electrode PE2 may be influenced by the second capacitor C2 and becomes smaller than the threshold voltage, and the pixel P' is in the color display mode.

Figure 3C:
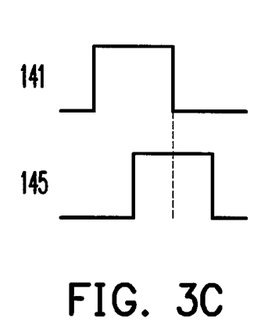

Referring to FIG. 3A and FIG. 3C, in this embodiment, the pulse (corresponding to the scan signal SC) of the scan line 141 is firstly formed, then the pulse (corresponding to the driving signal) of the driving line 145 is formed. That is, after the scan line 141 receiving the scan signal SC, the driving line 145 receives the driving signal. Now, the TFT M2 and the TFT M3 are sequentially conducted and the conducted period of the TFT M2 and the TFT M3 are overlapped, that is, after the TFT M2 is switched to be not conducted, the TFT M3 keeps conducted for a period, the voltage of the second pixel electrode PE2 is influenced by the second capacitor C2 and becomes smaller than the threshold voltage, and the pixel P' is in the color display mode.

Figure 3D:
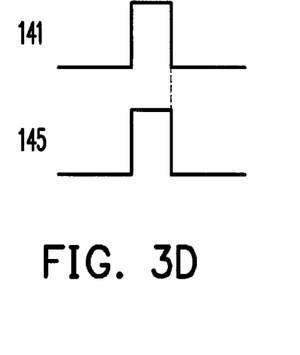

Referring to FIG. 3A and FIG. 3D, in this embodiment, the pulse (corresponding to the scan signal SC) of the scan line 141 and the pulse (corresponding to the driving signal) of the driving line 145 are formed at the same time. That is, the scan line 141 receives the scan signal SC and the driving line 145 receives the driving signal at the same time. Now, as the TFT M2 and the TFT M3 are conducted at the same time and the conducted period of the TFT M2 and the TFT M3 are totally overlapped, the voltage of the second pixel electrode PE2 is influenced by the pixel voltage VP and greater than or equal to the threshold voltage or even equal to the pixel voltage VP, and the pixel P' is in the whiteboard mode.

Figure 3E:
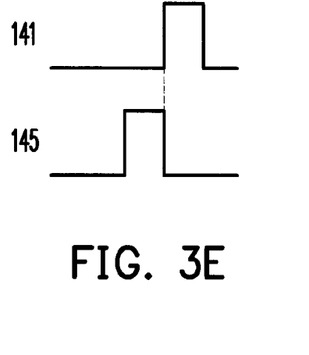

Referring to FIG. 3A and FIG. 3E, in this embodiment, after the pulse (corresponding to the driving signal) of the driving line 145 is formed, the pulse (corresponding to the scan signal SC) of the scan line 141 is formed. That is, after the driving line 145 fully receiving the driving signal, the scan line 141 fully receives the scan signal SC. Now, as the TFT M3 and the TFT M2 are sequentially conducted and the conducted period of the TFT M2 and the TFT M3 are not overlapped with each other, the voltage of the second pixel electrode PE2 is influenced by the pixel voltage VP and greater than or equal to the threshold voltage or even equal to the pixel voltage VP, and the pixel P' is in the whiteboard mode.

Figure 3F:
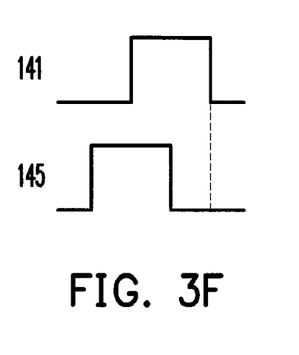

Referring to FIG. 3A and FIG. 3F, in this embodiment, the pulse (corresponding to the driving signal) of the driving line 145 is firstly formed, then the pulse (corresponding to the scan signal SC) of the scan line 141 is formed. That is, after the driving line 145 receiving the driving signal, the scan line 141 receives the scan signal SC. Now, as the TFT M3 and the TFT M2 are sequentially conducted and the conducted period of the TFT M2 and the TFT M3 are partially overlapped, that is, when the TFT M3 is switched to be not conducted, the TFT M2 keeps conducting for a period, the voltage of the second pixel electrode PE2 is greater than or equal to the threshold voltage or even equal to the pixel voltage VP, and the pixel P' is in the whiteboard mode.

In this embodiment, the discharge unit 330 is electrically connected to the driving line 145, but in other embodiments, the discharge unit 330 may be electrically connected to another scan line 141. Referring to FIG. 3A, FIG. 3B and FIG. 3E, in the situation that the scan signals SC are not overlapped and the scan signals SC of display panel 140 are driven by forward scanning, the display panel 140 is in the color display mode. If the scan signals SC of display panel 140 are driven by backward scanning, the display panel 140 is in the whiteboard mode. On the other hand, referring to FIG. 3A, FIG. 3C and FIG. 3F, in the situation that the scan signals SC are overlapped and the scan signals SC of the display panel 140 are driven by forward scanning, the display panel 140 is in the color display mode. If the scan signals SC of display panel 140 are driven by backward scanning, the display panel 140 is in the whiteboard mode.

Figure 4A:
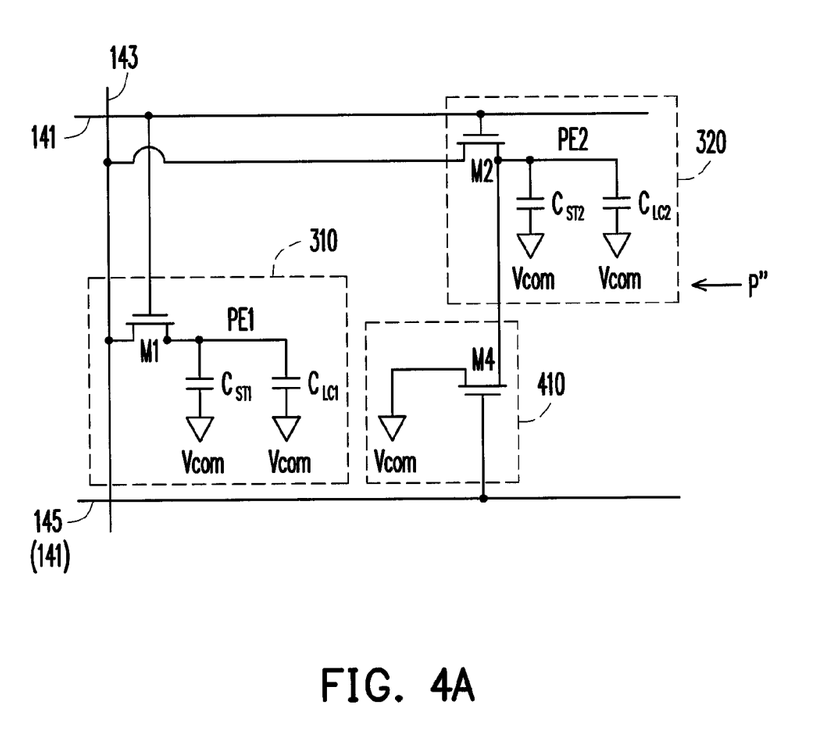
FIG. 4A is a schematic diagram of a circuit structure of a pixel P in FIG. 1 according to a second embodiment of the present invention.

FIG. 4A is a schematic diagram of a circuit structure of a pixel P in FIG. 1 according to a second embodiment of the present invention. Referring to FIG. 3A and FIG. 4A, the difference between the pixels P' and P''' is that the discharge unit 410 is electrically connect to the pixels P'''. The discharge unit 410 includes a second switch (here, for example, the TFT M4). The source (corresponding to the third end) of the TFT M4 is electrically connected to the common voltage Vcom, the drain (corresponding to the fourth end) of the TFT M4 is electrically connected to the second pixel electrode PE2 and a gate (corresponding to the second control end) of the TFT M4 is electrically connected to the driving line 145.

Referring to FIG. 1, FIG. 2 and FIG. 4A, when the TFT M4 is controlled by the signal (corresponding to the driving signal) transferred by the driving line 145 to be conducted, the voltage of the second pixel electrode PE2 is equal to the common voltage Vcom, that is, the voltage of the second pixel electrode PE2 is set to be common voltage Vcom (equivalent to be smaller than the threshold voltage). As the voltage of the second pixel electrode PE2 is the common voltage Vcom (that is, smaller than a threshold voltage), the liquid crystal (not shown) corresponding to the second pixel unit 320 (that is, corresponding to the second pixel electrode PE2) is not rotated and displays black. Now, the display panel 140 is in the color display mode, that is, each pixel P is in the color display mode.

On the other hand, when the TFT M2 is conducted and the TFT M4 is not conducted, the pixel voltage VP is transmitted to the pixel electrode PE2 via the conducted transistor M2, and the pixel electrode PE2 will not be electrically connected to the common voltage Vcom, so that the voltage of the pixel electrode PE2 is influenced by the pixel voltage VP and is increased or even equal to the pixel voltage VP. Now, the display panel 140 is in the whiteboard mode, that is, each pixel P is in the whiteboard mode.

Based on the above description, the discharge unit 410 is electrically connected to the second pixel electrode PE2 and sets the voltage of the second pixel electrode PE2 to be the common voltage Vcom according to the signal (corresponding to the driving signal) received by the driving line 145, so that the voltage of the second pixel electrode PE2 cannot drive the liquid crystal corresponding to the second pixel unit 320 and consequently the non-color resistant region NCR does not function equivalently.

Figure 4B:
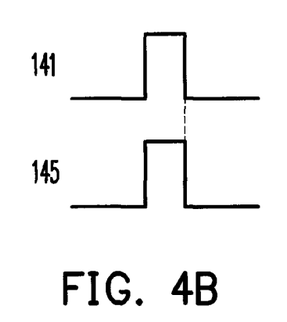
FIG. 4B to FIG. 4F are schematic diagram views of signals of a scan line 141 and a driving line 145 in FIG. 4A according to an embodiment of the present invention.

FIG. 4B to FIG. 4F are schematic diagrams of signals of a scan line 141 and a driving line 145 in FIG. 4A according to an embodiment of the present invention. Referring to FIG. 4A and FIG. 4B, in this embodiment, the pulse (corresponding to the scan signal SC) of the scan line 141 and the pulse (corresponding to the driving signal) of the driving line 145 are formed at the same time, that is, the scan line 141 receives the scan signal SC and the driving line 145 receives the driving signal at the same time. Now, as the TFT M2 and the TFT M4 are conducted at the same time and the conducted period of the TFT M2 and the TFT M4 are totally overlapped, the voltage of the second pixel electrode PE2 is set to be the common voltage Vcom, and the pixel P''' is in the color display mode.

Figure 4C:
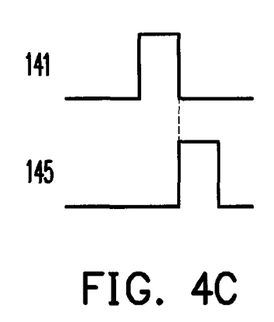

Referring to FIG. 4A and FIG. 4C, in this embodiment, after the pulse (corresponding to the scan signal SC) of the scan line 141 is firstly formed, the pulse (corresponding to the driving signal) of the driving line 145 is formed. That is, after the scan line 141 fully receiving the scan signal SC, the driving line 145 fully receives the driving signal. Now, as the TFT M2 and the TFT M4 are sequentially conducted and the conducted period of the TFT M2 and the TFT M4 are not overlapped with each other, the voltage of the second pixel electrode PE2 is set to be the common voltage Vcom, and the pixel P''' is in the color display mode.

Figure 4D:
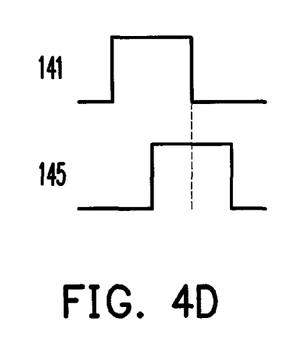

Referring to FIG. 4A and FIG. 4D, in this embodiment, the pulse (corresponding to the scan signal SC) of the scan line 141 is firstly formed, then the pulse (corresponding to the driving signal) of the driving line 145 is formed. That is, after the scan line 141 receives the scan signal SC, the driving line 145 receives the driving signal. Now, as the TFT M2 and the TFT M4 are sequentially conducted, and the conducted period of the TFT M2 and the TFT M4 are overlapped, that is, when the TFT M2 is switched to be not conducted, the TFT M4 keeps conducted for a period, the voltage of the second pixel electrode PE2 is set to be the common voltage Vcom, and the pixel P''' is in the color display mode.

Figure 4E:
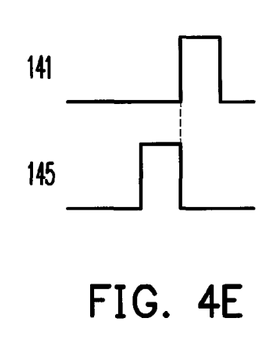

Referring to FIG. 4A and FIG. 4E, in this embodiment, after the pulse (corresponding to the driving signal) of the driving line 145 is formed, the pulse (corresponding to the scan signal SC) of the scan line 141 is formed. That is, after the driving line 145 fully receiving the driving signal, the scan line 141 receives the scan signal SC. Now, as the TFT M4 and the TFT M2 are sequentially conducted and the conducted period of the TFT M2 and the TFT M4 are not overlapped respectively, the voltage of the second pixel electrode PE2 is influenced by the pixel voltage VP and greater than or equal to the threshold voltage or even equal to the pixel voltage VP, and the pixel P''' is in the whiteboard mode.

Figure 4F:
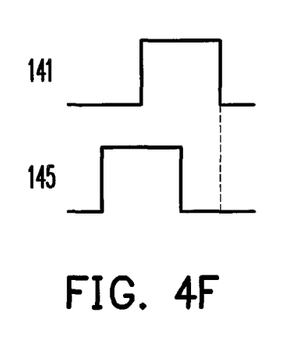

Referring to FIG. 4A and FIG. 4F, in this embodiment, the pulse (corresponding to the driving signal) of the driving line 145 is firstly formed, then the pulse (corresponding to the scan signal SC) of the scan line 141 is formed. That is, after the driving line 145 receiving the driving signal, the scan line 141 receives the scan signal SC. Now, as the TFT M4 and the TFT M2 are sequentially conducted and the conducted period of the TFT M2 and the TFT M4 are overlapped, the voltage of the second pixel electrode PE2 is influenced by the pixel voltage VP and greater than or equal to the threshold voltage or even equal to the pixel voltage VP, and the pixel P''' is in the whiteboard mode.

In this embodiment, the discharge unit 410 is electrically connected to the driving line 145, but in other embodiments, the discharge unit 410 may be electrically connected to another scan line 141. Referring to FIG. 4A, FIG. 4C and FIG. 4E, in the situation that the scan signals SC are not overlapped and the display panel 140 is driven by forward scanning, the display panel 140 is in the color display mode. If the display panel 140 is driven by backward scanning, the display panel 140 is in the whiteboard mode. On the other hand, referring to FIG. 4A, FIG. 4D and FIG. 4F, in the situation that the scan signals SC are partially overlapped and the display panel 140 is driven by forward scanning, the display panel 140 is in the color display mode. If the display panel 140 is driven by backward scanning, the display panel 140 is in the whiteboard mode.

Figure 5A:
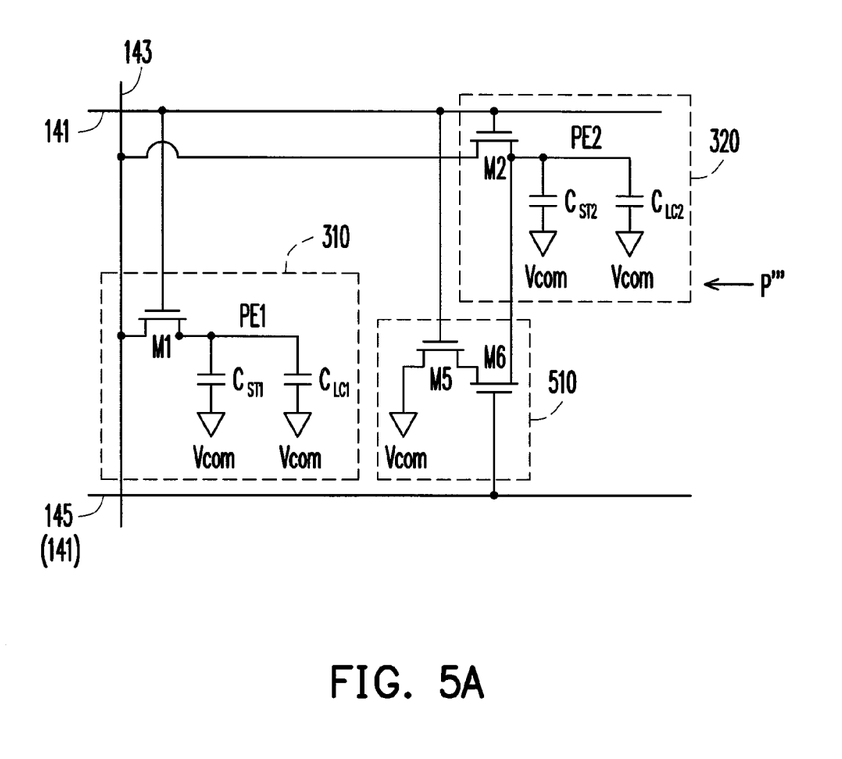
FIG. 5A is a schematic diagram of a circuit structure of a pixel P in FIG. 1 according to a third embodiment of the present invention.

FIG. 5A is a schematic diagram of a circuit structure of a pixel P in FIG. 1 according to a third embodiment of the present invention. Referring to FIG. 3A and FIG. 5A, the difference between the pixels P' and P''' is that the discharge unit 510 is electrically connect to the pixels P'''. The discharge unit 510 is further electrically connected to the scan line 141. The discharge unit 510 includes a third switch (here, for example, the TFT M4) and a fourth switch (here, for example, the TFT M5). The source (corresponding to the fifth end) of the TFT M4 is electrically connected to the common voltage Vcom, the drain (corresponding to the sixth end) of the TFT M4 is electrically connected to the source (corresponding to the seventh end) of the TFT M5 and the gate (corresponding to the third control end) of the TFT M4 is electrically connected to the scan line 141. The drain (corresponding to the eighth end) of the TFT M5 is electrically connected to the second pixel electrode PE2, the gate (corresponding to the fourth control end) of the TFT M5 is electrically connected to the driving line 145.

Referring to FIG. 1, FIG. 2 and FIG. 5A, when the TFT M5 is controlled by the signal (corresponding to the driving signal) transferred by the driving line 145 to be conducted and the TFT M6 is controlled by the signal (corresponding to the scan signal SC) transferred by the scan line 141 to be conducted, the voltage of the second pixel electrode PE2 becomes equal to the common voltage Vcom, that is, the voltage of the second pixel electrode PE2 is set to be the common voltage Vcom (equivalent to be smaller than the threshold voltage). As the voltage of the second pixel electrode PE2 is the common voltage Vcom (that is, smaller than a threshold voltage), the liquid crystal (not shown) corresponding to second pixel unit 320 (that is, corresponding to the second pixel electrode PE2) is not rotated to display black. Now, the display panel 140 is in the color display mode, that is, each pixel P is in the color display mode.

On the other hand, when the TFT M2 is conducted and one or all of the TFT M5 and the TFT M6 are not conducted, the pixel voltage VP is transmitted to the pixel electrode PE2 via the conducted transistor M2, and the pixel electrode PE2 will not be electrically connected to the common voltage Vcom, so that the voltage of the pixel electrode PE2 is influenced by the pixel voltage VP and is increased or even equal to the pixel voltage VP. Now, the display panel 140 is in the whiteboard mode, that is, each pixel P is in the whiteboard mode.

Based on the above description, the discharge unit 510 is electrically connected to the second pixel electrode PE2 and sets the voltage of the second pixel electrode PE2 to be the common voltage Vcom according to the signal (corresponding to the driving signal) received by the driving line 145 and the signal (corresponding to the scan signal) received by the scan line 141, so that the voltage of the second pixel electrode PE2 cannot drive the liquid crystal corresponding to the second pixel unit 320 and thus the non-color resistant NCR region does not function equivalently.

Figure 5B:
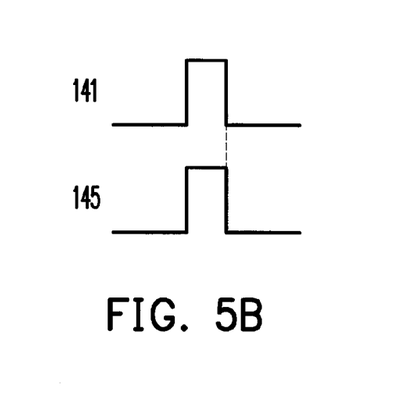
FIG. 5B to FIG. 5F are schematic diagram of signals of a scan line 141 and a driving line 145 in FIG. 5A according to an embodiment of the present invention.

FIG. 5B to FIG. 5F are schematic diagrams of signals of a scan line 141 and a driving line 145 in FIG. 5A according to an embodiment of the present invention. Referring to FIG. 5A and FIG. 5B, in this embodiment, the pulse (corresponding to the scan signal SC) of the scan line 141 and the pulse (corresponding to the driving signal) of the driving line 145 are formed at the same time. That is, the scan line 141 receives the scan signal SC and the driving line 145 receives the driving signal at the same time. Now, as the TFTs M2, M5 and M6 are conducted at the same time and the conducted period of the TFT M2, the TFT M5 and the TFT M6 are totally overlapped, the voltage of the second pixel electrode PE2 is set to be the common voltage Vcom, and the pixel P''' is in the color display mode.

Figure 5C:
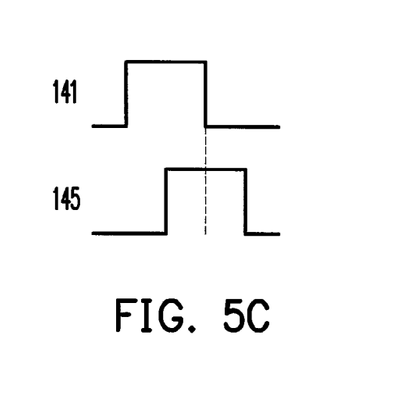

Referring to FIG. 5A and FIG. 5C, in this embodiment, the pulse (corresponding to the scan signal SC) of the scan line 141 is firstly formed, then the pulse (corresponding to the driving signal) of the driving line 145 is formed. That is, after the scan line 141 receiving the scan signal SC, the driving line 145 receives the driving signal. Now, after the TFT M2 and the TFT M5 are conducted, the TFT M6 is conducted and the conducted period of the TFT M2, the TFT M5 and the TFT M6 are overlapped, that is, before the TFT M2 is switched to be not conducted, the TFT M5 and the TFT M6 keep conducted, so the voltage of the second pixel electrode PE2 is set to be the common voltage Vcom, and the pixel P''' is in the color display mode.

Figure 5D:
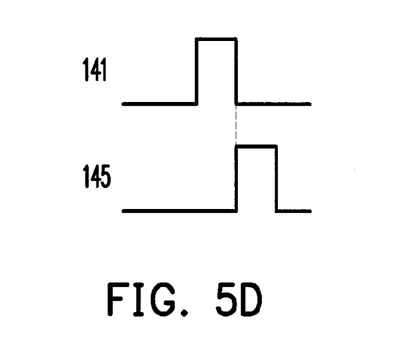

Referring to FIG. 5A and FIG. 5D, in this embodiment, the pulse (corresponding to the scan signal SC) of the scan line 141 is firstly formed, then the pulse (corresponding to the driving signal) of the driving line 145 is formed. That is, after the scan line 141 fully receiving the scan signal SC, the driving line 145 receives the driving signal. Now, after the TFT M2 and the TFT M5 are switched to be not conducted, the TFT M6 is conducted, so the voltage of the second pixel electrode PE2 is influenced by the pixel voltage VP and greater than or equal to the threshold voltage or even equal to the pixel voltage VP, and the pixel P''' is in the whiteboard mode.

Figure 5E:
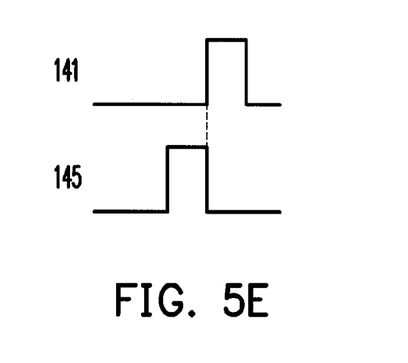

Referring to FIG. 5A and FIG. 5E, in this embodiment, after the pulse (corresponding to the driving signal) of the driving line 145 is formed, the pulse (corresponding to the scan signal SC) of the scan line 141 is formed. That is, after the driving line 145 fully receiving the driving signal, the scan line 141 receives the scan signal SC. Now, after the TFT M6 is switched to be not conducted, the TFT M2 and the TFT M5 are conducted, so the voltage of the second pixel electrode PE2 is influenced by the pixel voltage VP and greater than or equal to the threshold voltage or even equal to the pixel voltage VP, and the pixel P''' is in the whiteboard mode.

Figure 5F:
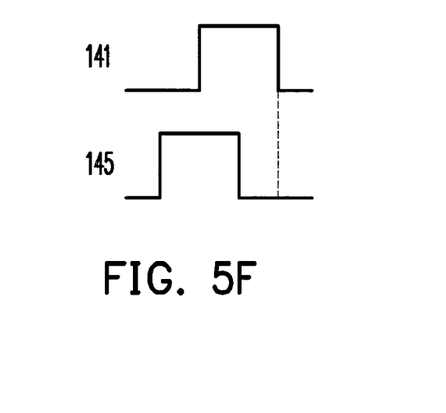

Referring to FIG. 5A and FIG. 5F, in this embodiment, the pulse (corresponding to the driving signal) of the driving line 145 is firstly formed, then the pulse (corresponding to the scan signal SC) of the scan line 141 is formed. That is, after the driving line 145 receives the driving signal, the scan line 141 receives the scan signal SC. Now, when the TFT M6 is switched to be not conducted, the TFT M2 and the TFT M5 keep conducted for a period, so the voltage of the second pixel electrode PE2 is influenced by the pixel voltage VP and becomes greater than or equal to the threshold voltage or even equal to the pixel voltage VP, and the pixel P''' is in the whiteboard mode.

In this embodiment, the discharge unit 510 is electrically connected to the driving line 145, but in other embodiments, the discharge unit 510 may be electrically connected to another scan line 141. Referring to FIG. 5A, FIG. 5C and FIG. 5F, in the situation that the scan signals SC are overlapped and the display panel 140 is driven by forward scanning, the display panel 140 is in the color display mode. If the display panel 140 is driven by backward scanning, the display panel 140 is in the whiteboard mode.

Figure 6:
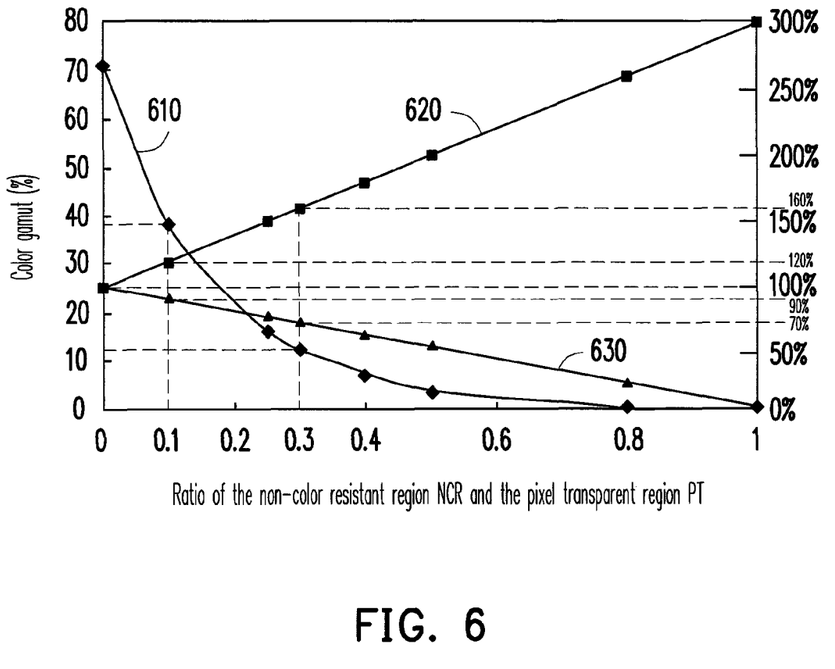
FIG. 6 is a schematic diagram of a correspondence of a ratio of a non-color resistant region and a color gamut and a light transmittance in FIG. 2 according to an embodiment of the present invention.

FIG. 6 is a schematic diagram of a correspondence of a ratio of a non-color resistant region, a color gamut and a light transmittance in FIG. 2 according to an embodiment of the present invention. Referring to FIG. 2 and FIG. 6, a curve 610 indicates changes of the color gamut (based on the NTSC color gamut) of the pixel P, a curve 620 indicates changes of the light transmittance of the pixel P in the whiteboard mode and a curve 630 indicates changes of the light transmittance of the pixel P in the color display mode. When a ratio of the non-color resistant region NCR and the pixel transparent region PT is 0 (that is, the color resistant region CR accounts for 100% of the pixel transparent region PT), the color gamut of the pixel P is about 70% of the NTSC color gamut and the light transmittance is defined to be 100%.

When the ratio of the non-color resistant region NCR and the pixel transparent PT region increases, the ratio of the color resistant region CR and the pixel transparent PT region is reduced accordingly, so the color gamut of the pixel P may be lowered, the light transmittance of the pixel P in the color display mode may be lowered and the light transmittance of the pixel P in the whiteboard mode is increased.

When the color gamut of the pixel P is smaller than or equal to 10% of the NTSC color gamut, the color exhibition is not apparent, so the upper limit of the ratio of the non-color resistant NCR region and the pixel transparent PT region may be set to 0.3 (that is, 30%). On the other hand, when the light transmittance of the pixel P in the whiteboard mode is greater than or equal to 120%, the effect is apparent, so the lower limit of the ratio of the non-color resistant region NCR and the pixel transparent PT region PT may be set to 0.1 (that is, 10%).

Based on the above description, in consideration of the color gamut and the light transmittance, the ratio of the non-color resistant NCR region and the pixel transparent PT region may be set to 10%~30%. That is, the area of the non-color resistant NCR region accounts for 10%~30% of the area of the pixel transparent PT region. The above setting is made in consideration of the color gamut and the light transmittance, and regardless the color gamut and the light transmittance, the ratio of the non-color resistant NCR region and the pixel transparent PT region may be set to 1%~99%, which may be modified by persons of ordinary skilled in the art.

In addition, in other embodiments, the display 100 may be operated together with a touch module to realize the writing function of the electronic whiteboard. The touch module may be a resistance touch device, a capacitive touch device, an optical touch device, an acoustic wave touch device or an electromagnetic touch device, which is not limited by the embodiments of the present invention.

In view of the above, in the pixel structure according to the embodiments of the present invention, the discharge unit sets that the voltage of the second pixel electrode is smaller than the threshold voltage according to the driving signal of the driving line to make the non-color resistant region is not functioned and the pixel structure stay in the color display mode. When the voltage of the second pixel electrode is greater than or equal to the threshold voltage, the non-color resistant region is functioned and the pixel structure is in the whiteboard mode. In some embodiments, the discharge unit sets that the voltage of the second pixel electrode is smaller than the threshold voltage according to the driving signal of the driving line and the scan signal of the scan line. Whereby, one display panel can meet the display requirements of both the LCD TV and the electronic whiteboard.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure electrically connected to a scan line, a driving line and a data line, comprising:
   a first pixel unit, comprising:
      a first active device, comprising a first gate, a first source and a first drain, wherein the first gate is electrically connected to the scan line and the first drain is electrically connected to the data line; and
      a first pixel electrode, electrically connected to the first source;
   a second pixel unit, comprising:
      a second active device, comprising a second gate, a second source and a second drain, wherein the second gate is electrically connected to the scan line and the second drain is electrically connected to the data line; and
      a second pixel electrode, electrically connected to the second source; and
   a discharge unit, electrically connected to the second pixel electrode and the scan line, to set a voltage of the second pixel electrode smaller than a threshold voltage according to a driving signal received by the driving line and a scan signal received by the scan line, wherein a common voltage is transferred to the second pixel electrode by the discharge unit when pulses of the driving signal and the scan signal are overlapped.

2. The pixel structure according to claim 1, wherein the discharge unit comprises:
   a first switch, comprising a first end, a second end and a first control end, wherein the first end is electrically connected to the common voltage and the first control end is electrically connected to the scan line; and
   a second switch, comprising a third end, a fourth end and a second control end, wherein the third end is electrically connected to the second end, the fourth end is electrically connected to the second pixel electrode, and the second control end is electrically connected to the driving line.

3. The pixel structure according to claim 2, wherein when the scan line and the driving line fully receive the scan signal and the driving signal at the same time, the pixel structure is in a color display mode, and when the time the scan line fully receives the scan signal is earlier than or later than that the driving line fully receives the driving signal, the pixel structure is in a whiteboard mode.

4. The pixel structure according to claim 3, further comprising:
   a color resistant region, configured corresponding to the first pixel unit; and
   a non-color resistant region, configured corresponding to the second pixel unit;
   wherein a sum of an area of the color resistant region and an area of the non-color resistant region is substantially equal to an area of a pixel transparent region.

5. The pixel structure according to claim 1, further comprising:
   a color resistant region, configured corresponding to the first pixel unit; and
   a non-color resistant region, configured corresponding to the second pixel unit;
   wherein a sum of an area of the color resistant region and an area of the non-color resistant region is equal to an area of a pixel transparent region.

6. The pixel structure according to claim 5, wherein the area of the non-color resistant region accounts for 10%-30% of the area of the pixel transparent region.

7. The pixel structure according to claim 5, wherein the color resistant region is one of a red color resistant region, a green color resistant region and a blue color resistant region.

8. The pixel structure according to claim 1, wherein the driving line is a first scan line.

9. The pixel structure according to claim 1, wherein the first active device and the second active device are thin film transistors (TFTs).

10. A pixel structure electrically connected to a scan line, a driving line and a data line, comprising:
    a first pixel unit, comprising:
       a first active device, comprising a first gate, a first source and a first drain, wherein the first gate is electrically connected to the scan line and the first drain is electrically connected to the data line; and
       a first pixel electrode, electrically connected to the first source;
    a second pixel unit, comprising:
       a second active device, comprising a second gate, a second source and a second drain, wherein the second gate is electrically connected to the scan line and the second drain is electrically connected to the data line; and
       a second pixel electrode, electrically connected to the second source; and
    a discharge unit, electrically connected to the second pixel electrode and the scan line, to set a voltage of the second pixel electrode smaller than a threshold voltage according to a driving signal received by the driving line and a scan signal received by the scan line,
    wherein the discharge unit comprises:
    a first switch, comprising a first end, a second end and a first control end, wherein the first end is electrically connected to a common voltage and the first control end is electrically connected to the scan line; and
    a second switch, comprising a third end, a fourth end and a second control end, wherein the third end is electrically connected to the second end, the fourth end is electrically connected to the second pixel electrode, and the second control end is electrically connected to the driving line.

* * * * *